(12) United States Patent
Harsley (10) Patent No.: US 7,704,587 B2
(45) Date of Patent: Apr. 27, 2010

(54) TIE STRIPS (76) Inventor: Andrew John Harsley, 161 Queensway, Grantham, Lincolnshire, NG31 9RB (GB)

( * ) Notice: Subject to any disclaimer, the term of this patent is extended or adjusted under 35 U.S.C. 154(b) by 583 days.

(21) Appl. No.: 10/560,137

(22) PCT Filed: Jun. 10, 2004

(86) PCT No.: PCT/GB2004/002462
§ 371 (c)(1),
(2), (4) Date: Dec. 9, 2005

(87) PCT Pub. No.: WO2004/108550
PCT Pub. Date: Dec. 16, 2004

(65) Prior Publication Data
US 2006/0127638 A1  Jun. 15, 2006

(30) Foreign Application Priority Data
Jun. 10, 2003  (GB)  ................................. 0313319.6

(51) Int. Cl.
B32B 3/24 (2006.01)
F16L 33/03 (2006.01)

(52) U.S. Cl. .................. 428/136; 428/131; 428/134; 24/17 A; 24/17 B (58) Field of Classification Search .................. 428/136, 428/131, 143; 24/17 A, 17 B
See application file for complete search history.

(56) References Cited

U.S. PATENT DOCUMENTS 3,438,095 A  4/1969  Evans
5,799,376 A  9/1998  Harsley

FOREIGN PATENT DOCUMENTS

DE  40 07 784 A  9/1991

*Primary Examiner*—William P Watkins, III
(74) *Attorney, Agent, or Firm*—Sonnenschein Nath & Rosenthal LLP; Bryan P. Stanley (57) ABSTRACT

A flexible, integrally formed tie strip for forming a loop when passed through itself comprises a plurality of identical cells formed in a strip, the cells forming generally loop-shaped enclosed apertures (10) bounded by wall portions of the cells, each aperture allowing the passage of further cells through it. The cells are further provided with one or more latching members (11) allowing passage of one cell through another in one direction but preventing passage of the cell in the reverse direction. The walls (9) bounding the apertures can be folded to a saddle shape about radial and longitudinal axes, so as to increase the width of the aperture without stretching the material of the walls, thereby facilitating the passage of a penetrating cell through the aperture of another cell. Moreover the penetrating cell is designed to fold so as to pass through still more easily. This three-dimensional deformation is promoted by a notch (15) in the rear of each aperture wall.

18 Claims, 7 Drawing Sheets

TIE STRIPS

This is the United States National Stage of Patent Cooperation Treaty Application No. PCT/GB2004/002462 filed Jun. 10, 2004, which claims priority to British Patent Application No. 0313319.6, filed Jun. 10, 2003.

FIELD OF THE INVENTION

The present invention relates to tie strips, for example cable ties or horticultural plant ties.

BACKGROUND

Cable ties and other forms of tie strip are used to secure items together quickly and easily. Example uses include bundling cables, sealing bags or binding plants to stakes.

One conventional type of tie strip is a long thin plastic device, with an apertured head at one end, extending from which is a slimmer tail portion. On insertion of the tail portion into the aperture of the head portion, the head engages with one of a series of latches spaced along the tail, and thereby prevents its withdrawal. A closed loop is thus formed by the strip which may be pulled tight around target items to fasten them together.

One significant disadvantage of such a tie strip is that the tail portion pulled through the head during fitting is wasted, because it performs no function and cannot be re-used. Only the tail portion forming the closed loop finds utility.

Another major disadvantage of conventional tie strips is their constrictive nature. Such tie strips are readily tightened, but do not allow the enclosed items any room to grow, expand or deform.

An alternative tie strip that reduces waste is found in prior art DE 2,524,013 which discloses a tie consisting of a plurality of apertured cells.

However, in any tie strip composed of a repetition of unit cell portions, the transverse width of the strip will always exceed the relative transverse width of the unit cells' apertures. In order to form a closed loop it is therefore necessary either to reduce the width of the strip and/or to increase the width of the apertures.

The form of tie strip described in DE 2,524,013 solves this problem by placing apertures substantially longitudinally along the strip that are longer than the strip is wide. The strip may then be inserted through itself at any aperture point by twisting the front end of the strip through 90°. The tie can then be pulled around the target items and secured in place by a reverse twist of 90°. The unused tail portion of this tie strip can then be used again, if it is long enough, thereby greatly reducing waste.

Alternatively, prior art U.S. Pat. No. 3,438,095 uses a similar design of cell, but without the need for any twisting, relying instead on applied force and material deformation to achieve threading.

Other alternative waste-reducing tie strip concepts are found in U.S. Pat. No. 3,913,178 and U.S. Pat. No. 4,150,463 wherein a continuous flat strip narrows by virtue of being foldable along its longitudinal axis, and utilises punched barbs along the centre of the strip which engage with the residual apertures formed from other such punched barbs on other portions of the strip, preferably once the tie is in a folded state. No longitudinal deformation is possible.

Another alternative tie strip is found in the inventor's earlier U.S. Pat. No. 5,799,376. This tie is also formed from a plurality of apertured cells, but threading is achieved by the use of bendingly deformable spring portions extending from the strip. These allow cells to expand and/or contract to facilitate passage.

This form of tie strip not only reduces waste, but also incorporates some longitudinal expansion by virtue of the spring portions which project laterally from the longitudinal axis. The major problem with this form of tie strip is the reliance on the mechanical properties of the spring portions correctly to expand and contract laterally during the threading process and subsequently to return to a latching state following insertion.

SUMMARY OF THE PRESENT INVENTION

According to the present invention, an integrally formed tie strip is made from flexible, e.g. polymeric or rubberised, material consisting of a plurality of cells spaced along the length of the strip, each cell being provided with one or more latching members, the cells enclosing apertures bounded by wall portions; wherein each cell can fold transversely with respect to the longitudinal axis of the strip into a saddle shape whose sides can then additionally fold outwards to increase the width of the apertures to permit the transit of other such cells and wherein during threading or attempted withdrawal the wall portions and/or latching members of the penetrating cells preferentially curl about their longitudinal axes out of the plane of the strip to facilitate their threading and subsequent latching or to inhibit withdrawal. The rear cell wall (i.e. in the threading direction) can be notched or even broken so as to increase cell flexibility.

In the present invention a change in the shape of the cell portions is effected by the passage of a cell through an aperture such that the aperture folds about its lateral axis (transverse to the longitudinal axis and in the plane of the strip) into a curved double arch or saddle shape wherein further insertion of the first unit cell portion causes the deformed aperture to be extended transversely, increasing its lateral width, to facilitate passage of the first cell portion.

Additionally, lateral contraction of the first cell portion may be effected by the curling of the bounding walls and/or latching members of the first cell out of the horizontal plane of the strip causing the said cell portion to narrow laterally as it passes through the transverse aperture of the second cell portion. Broadly speaking, only the penetrated and the penetrating cells are twisted out of shape, all the others at any one time being merely strengthened longitudinally.

Subsequent to passage of the first cell portion through the aperture of the second cell portion, any elastic properties of the material may substantially restore the first and/or second cell to their original shape and serve to locate the protruding latching members of the first cell into a position that prevents its withdrawal through threaded aperture, thereby forming a closed loop.

Alternatively, any residual tension in the loop, or attempt to withdraw the first cell from the second, invokes similar or additional curling of the walls and/or latching members of the first cell into a position that impedes withdrawal from the aperture and/or the tension induces a complementary rotation of the walls of the second unit cell portion to present a multi-dimensional configuration suitable for achieving a superior latch integrity than could be attained by the first and/or second cell in a relaxed state alone.

Additionally, tension in the strip may also effect rotation of the latching members about an axis (Z-axis) perpendicular to the horizontal (X-Y) plane of the strip such that the latching members move outwards under longitudinal tension thereby increasing the lateral width of the first unit cell portion to inhibit withdrawal.

Preferably, during threading any curling of the walls and/or latching members is away from the direction of threading and inwardly towards the target items to be bound such that the latching members do not stand proud of the strip during threading and thereby do not impede passage.

During any attempted withdrawal of the first unit cell portion through the aperture the opposite should preferably be true, with the latching members curling outwards away from the bound target items such that they engage with the wall portions of the second unit cell portion and impede removal. The walls of the aperture portion may be specially channelled to assist this process and ensure the curling acts in the desired direction.

Because the threading and latching system of the present invention does not rely on spring portions to effect the deformation of the cells, it can be fabricated from materials that do not have pronounced intrinsic elastic or resilient properties, for example flexible sheets of metal or plastic. However, a preferred embodiment of the invention would make use of elasticised or rubberised material to afford the tie strip longitudinal expansion and thereby protect bound items within the closed tie loop.

Furthermore it is to be noted that the present invention does not need to be folded along its longitudinal axis, nor rotated axially by 90°, to be inserted through any given aperture, and the penetrant strip can thus remain longitudinally stiff when passing through the aperture of another cell.

A preferred embodiment of the invention is a thin one-part plastic strip manufactured from flexible material and consisting of a tongue portion at the re-entrant end to facilitate easy threading, and a plurality of similarly shaped unit cell portions extending from the tongue with their respective latching members pointing substantially away from the direction of the tongue end. Each of the unit cell portions is preferably generally circular or elliptical in shape, with a similarly shaped aperture passing vertically through or between the cells and horn-shaped latching members projecting from either side of the cell. It would also be possible to make a similar elliptical or circular cell design but cut from thin sheet of material such as plastic or flexible metal.

One can provide a shaped aperture formed from a notched rear wall such that upon insertion of the strip through a cell's aperture preferential curling of the penetrant cells is effected by this channel. The front wall of the following cell closes the gap formed by the notched rear wall of the leading cell, forming a closed aperture.

Any embodiment of the invention could also be produced as a continuous reel with or without re-entrant tongue portions included in the design.

SUMMARY OF THE DRAWINGS

For a better understanding of the invention, embodiments will now be described in detail with reference to the accompanying diagrams and drawings, in which:

FIG. 4 shows the cellular deformations occurring in conventional waste-reducing tie strips, wherein a) shows a relaxed cell;
b) shows a cell under longitudinal tension;
c) shows an opened-up cell during penetration of its aperture; and
d) shows a narrowed cell during insertion through an aperture;

DETAILED DESCRIPTION

Figure 1:
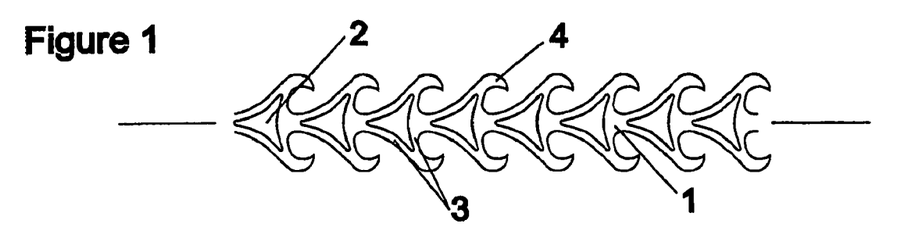
FIG. 1 shows a conventional waste-reducing tie strip utilising a plurality of cells, when in a relaxed state.

FIG. 1 portrays a portion of waste-free tie strip in a relaxed state 1 according to existing designs (e.g. prior art U.S. Pat. No. 5,799,376) in which an aperture 2 is bounded by inwardly curved wall portions 3, extending from which are latching members 4.

Figure 2:
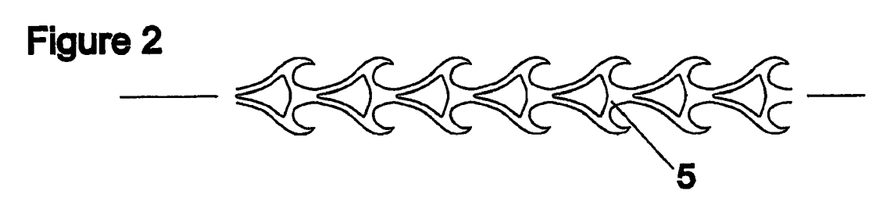
FIG. 2 shows a conventional waste-reducing tie strip when in a tensioned state.

When longitudinal tension is applied, the rear wall of each cell bends outwards 5 and the strip generally contracts transversely and extends longitudinally, as shown in FIG. 2.

Figure 3:
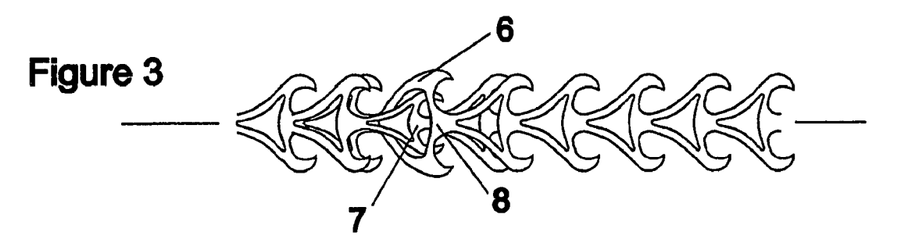
FIG. 3 shows a conventional waste-reducing tie strip during a threading procedure.

The side wall members are also able to bend outwards 6 and this occurs during the insertion of one cell 7 into another 8 (FIG. 3). It is to be noted that in this design the inserted (penetrant) cell 7 generally contracts laterally whereas the penetrated cell 8 generally expands laterally.

Subsequent to successful penetration of one cell though another, the wall portions return to an inwardly pointing state and the latching members of the inserted cell serve to prevent its withdrawal.

The full range of two-dimensional cellular deformations utilised in this prior art are given in FIG. 4.

Figure 4A:
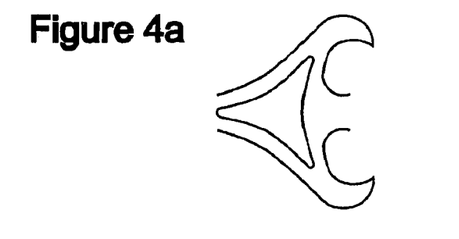
Figure 4B:
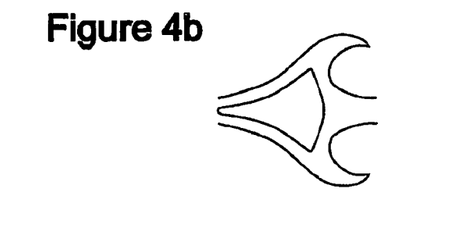
Figure 4C:
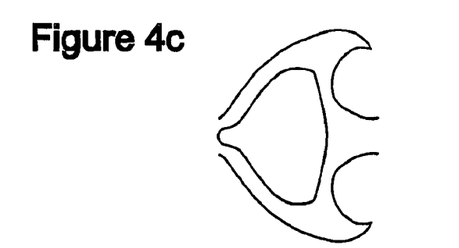
Figure 4D:
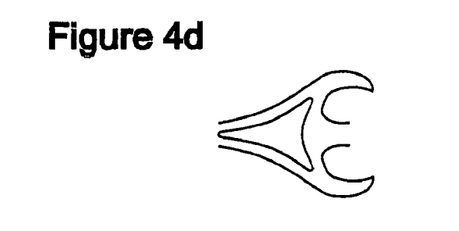
Figure 5:
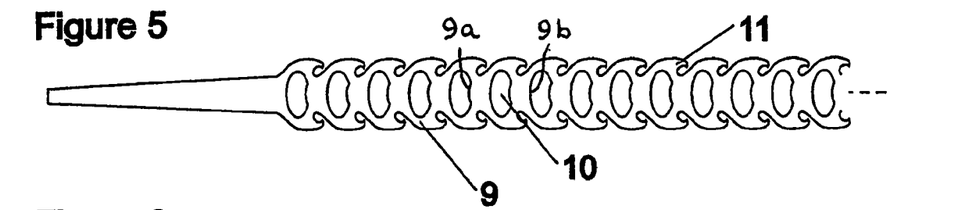
FIG. 5 shows a first preferred embodiment of the invention in a relaxed state.
Figure 6:
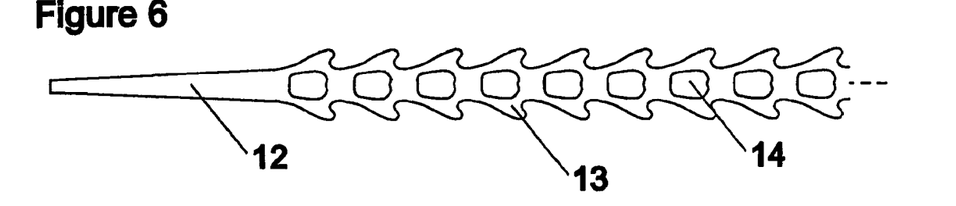
FIG. 6 shows a first preferred embodiment of the invention in a tensioned state.

Now in embodiments of the present invention a similarly configured tie strip is formed but with the walls 9 of the cells already formed in an expanded or roughly elliptical state (see FIGS. 5 and 6, and cf. FIG. 4*c*).

The cells are generally elliptical or in the form of a circular ring (or annulus), with a substantially similarly shaped aperture 10 through the centre of each, i.e. with a roughly constant wall thickness or cross-section. One or more latching members 11 are appended to the sides of the cell, facing backwards. They can be considered to be a continuation of the generally semicircular front wall 9*b* of the cell, with radial arms joining the front wall to the rear, thicker, wall.

These cells are attached one to another to form the tail of the strip, the front wall 9*b* of one cell forming or merging with the rear wall 9*a* of the next. After a suitable length may be terminated at the re-entrant end with a tongue portion 12 to assist threading.

Preferably the tie strip is manufactured from a single piece of material such as resilient plastic (e.g. nylon, polypropylene or polyurethane), from rubber or from suitable metal (e.g. spring steel). Injection moulding or stamping from sheet are the preferred modes of fabrication. Advantageously the strips should be around 5 to 30 mm wide, 1 to 5 mm thick, and up to 500 mm in length, perhaps more in special cases. In this dimensional range, the chosen material should preferably have a Shore hardness of around S80 to S90 or D40 to D60 (as determined by standard ASTM D2240), a flexural modulus of around 0.01 GPa to 0.1 GPa (as per ASTM D790), a high tear strength of around 100 KN/m or above (as per ASTM D624), and a tensile strength as high as possible, preferably exceeding 25 MPa at break (as per ASTM D412). For embodiments of the present invention on smaller scales, it is advantageous to utilise stiffer materials (i.e. a higher flexural modulus) with a higher tensile strength to those quoted above; and vice versa for embodiments of the present invention on larger scales, where weaker and more flexible materials can suffice. Examples of materials with appropriate advantageous properties (for the dimensions given above) can be found in the Elastollan and Texin ranges of polyurethanes offered by BASF and the Bayer Corporation respectively.

As with known tie strips, the present strip undergoes a slight transverse contraction and more noticeable longitudinal extension when subjected to longitudinal tension (FIG. 6). It can also be noted that the latching members 11 undergo a rotation about an axis perpendicular to the horizontal plane of the strip 13 (the Z axis), causing them to extend laterally (the Y direction).

This lateral extension of the latching members 13 serves to impede the threading of tensioned cells through other cells' apertures, hence the latches on conventional tie strips are generally kept small. Likewise the lateral contraction and narrowing of the apertures 14 also serves to impede operation, so in conventional designs the apertures are made as wide as possible and the walls as thin as possible, with a corresponding loss of strength. These problems are, however, soluble with the present invention, using a multistage topological approach, whereby the same shape cells are made to deform in different ways depending on their part in the fitting process.

Figure 9:
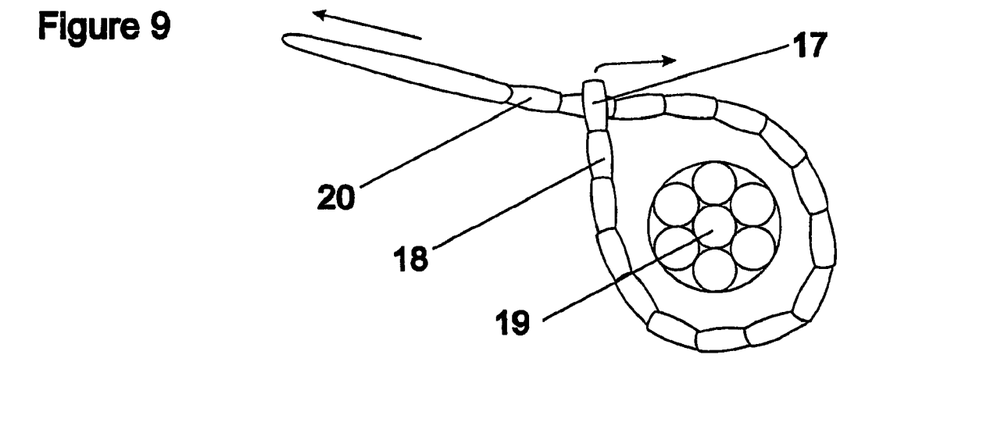
FIG. 9 shows a preferred technique for fitting the tie strip.

Preferably the tie strip is fitted by always inserting the tongue at the re-entrant end (if provided), through the rearmost cell portion 17 (FIG. 9). The whole strip can then be pulled through this aperture leaving a small loop 18 around the target items 19. In this manner the residual strip 20 can be removed and used again and again, with the tongue portion still attached, thereby greatly reducing wastage.

Figure 10:
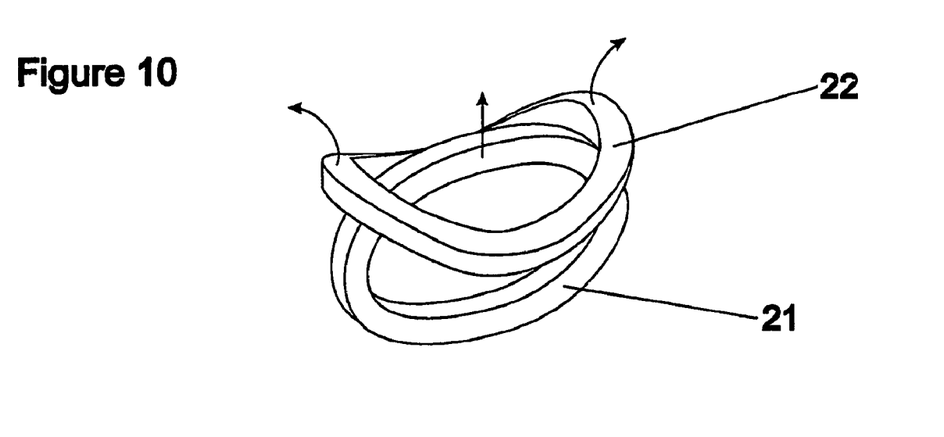
FIG. 10 shows a representation of the "double-bow/arch" or saddle shape produced during the initial threading process.
Figure 11:
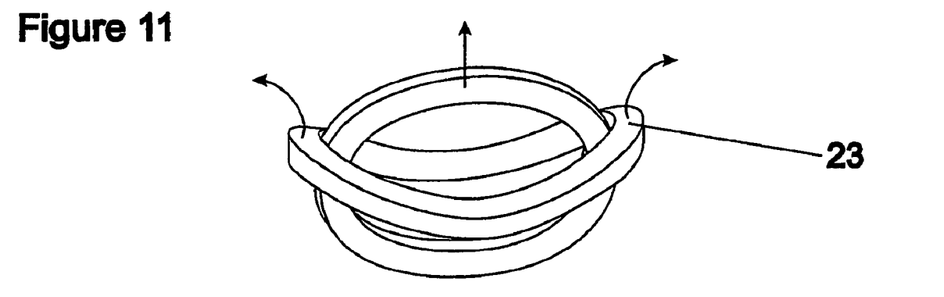
FIG. 11 shows a representation of the "double-bow" or saddle shape opening up as the threading process advances.
Figure 12:
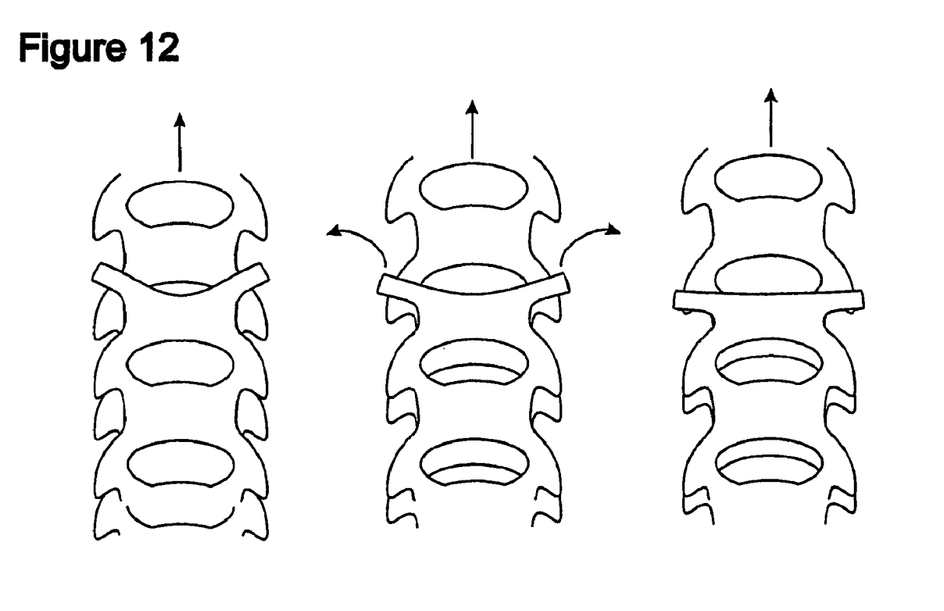
FIG. 12 shows three stages in the threading process.

The first stage is the insertion of one cell through an aperture, as characterised in FIGS. 10, 11 and 12. (Note that for simplicity FIGS. 10 and 11 show just two elliptical cells devoid of latching members, shaped aperture channels or other such features as may be described elsewhere.)

In FIG. 10 a penetrating first unit cell portion 21 is pressed against the aperture of a second, outer, unit cell portion 22 resulting in the folding of the second unit cell portion along the transverse axis into a saddle shape with the spine in the Y-direction of the strip.

Continue insertion of the first unit cell portion increases this folding to a point where the side lobe portions 23 create a "double-bow" or double-arch shape and then start to fold outwards (FIG. 11). This causes a lateral extension of the aperture without relying on any material-dependent spring portions as described in other tie strip designs. (The effect can indeed be demonstrated with non-elastic materials such as paper or card.)

If the lateral extension of the aperture is sufficient, then the whole of the penetrant unit cell portions may pass through substantially unimpeded, as shown in three stages in FIG. 12.

Ancillary to this mechanism, however, is a means of contracting the penetrant cells, such that they may pass through the apertures, expanded or not. This involves curling the penetrant cells as they pass through the aperture of another cell, and it is desirable to construct the cells of the tie strip in a manner that also promotes and controls this technique, in addition to the "saddle-folding" discussed above.

Figure 19:
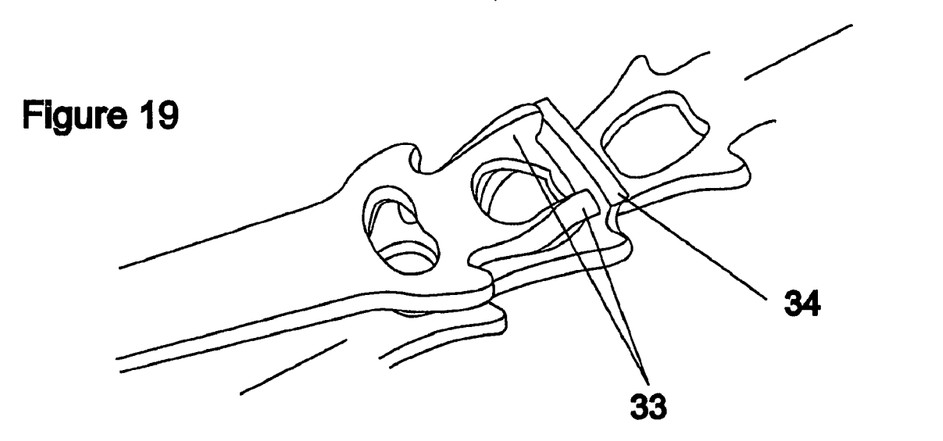
FIG. 19 shows the curling of the latching members effected by an attempted withdrawal of the threaded cells.

When the re-entrant end of a penetrant cell 24 enters the aperture of another penetrated cell 25, the penetrant cell's latching members 26 are forced to curl over, out of the main horizontal (X-Y) plane of the strip. (Cf. FIG. 19)

It is advantageous for the direction of the curl (up or down) to be dictated, and if the tie strip is made fully 3-dimensional (instead of a 2-dimensional shape of finite thickness), then it is possible to incorporate geometrical features on the upper and lower surfaces to so control this curling.

However, such modifications make the strip unnecessarily complicated to manufacture and force the strip to become an asymmetric product that requires a "right-way-up" to function. Additionally, it is necessary for the curling effect to switch from curl-up to curl-down at different parts of the fitting process, and this is contrary to an asymmetric design.

Figure 13:
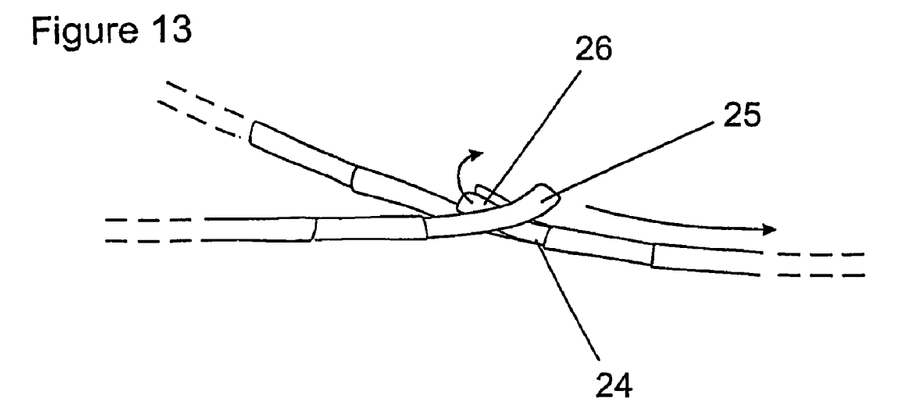
FIG. 13 shows the curling of the latching members during low angle threading stage.
Figure 14:
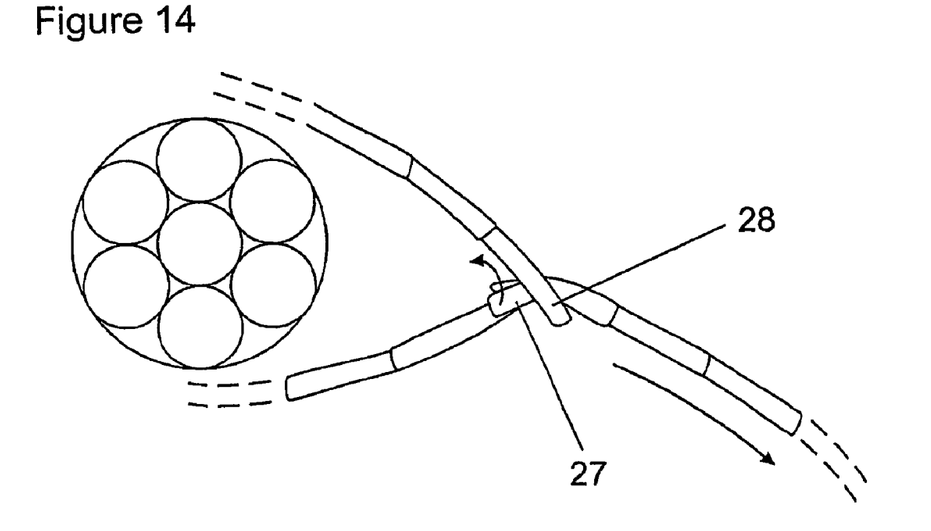
FIG. 14 shows the curling of the latching members during high angle threading stage.

One simple manner of achieving this desired control without resorting to 3-dimensional geometry is to adjust the angle of penetration manually, as illustrated in FIGS. 13 and 14.

Generally, at low threading angles—such as encountered in the first stages of threading—the latching members 26 will curl outwards from the target and towards the operator (FIG. 13), whereas at steeper angles of insertion, the latching members will curl inwards (27) towards the target, and away from the operator (FIG. 14). This is particularly noticeable as the loop closes in on the target, since at this stage the strip is usually pulled sharply against the rear wall of the penetrated cell, effectively breaking the back of the strip. This is illustrated in FIG. 14.

It is this latter inwards direction that is most desirable during the threading stage, because then it is the relatively smooth underside that slides over the rear wall of the penetrated cell 28. By contrast, if the latching members curl outwards (as in FIG. 13) then it is they that have to slide against the rear wall, and this causes a ratcheting action that inherently requires more force from the operator to effect transit of the penetrant cells.

Accordingly, the user of such tie strips could adjust the insertion angle so that the latching members always curl inwards, and a smooth sliding condition is maintained throughout.

Figure 15:
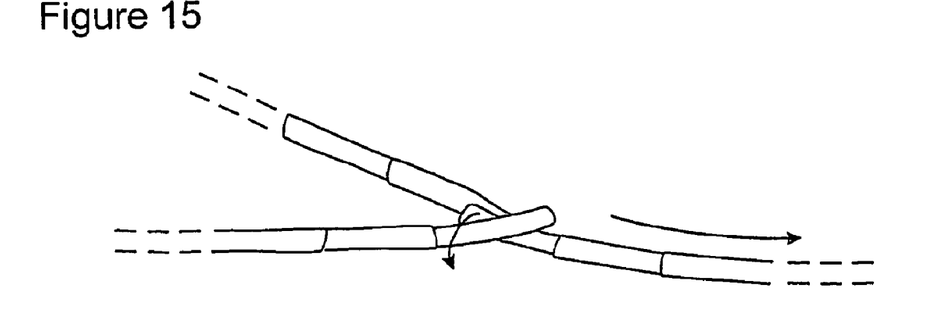
FIG. 15 shows the opposite curling effect of a suitably channelled aperture.

However, this often entails using both hands to slide the tie into position, and a superior solution is to modify the apertures of the cells to provide a specially shaped channel that promotes the correct inwards curling even at low insertion angles. FIG. 15 illustrates this point in comparison to FIG. 13.

Figure 7:
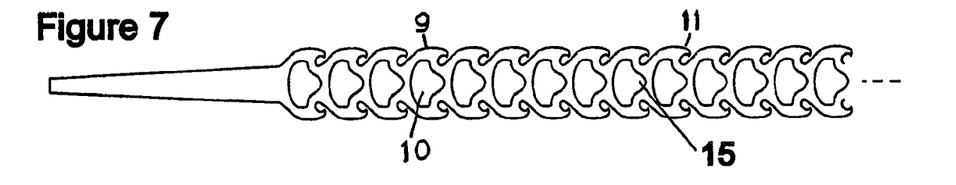
FIG. 7 shows a second preferred embodiment of the invention in a relaxed state.
Figure 8:
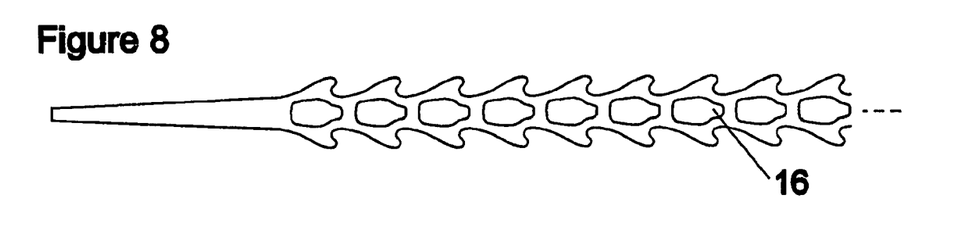
FIG. 8 shows a second preferred embodiment of the invention in a tensioned state.

Therefore, in an alternative preferred embodiment of the present invention (FIGS. 7 and 8) a small notch 15, 16 is cut into the rear wall of the cell. This important modification forces a compounding of the cells, so that a complete aperture is only formed by two adjacent cells, and it transforms the apertures into shaped channels that serve several purposes, as will be explained below.

Figure 16:
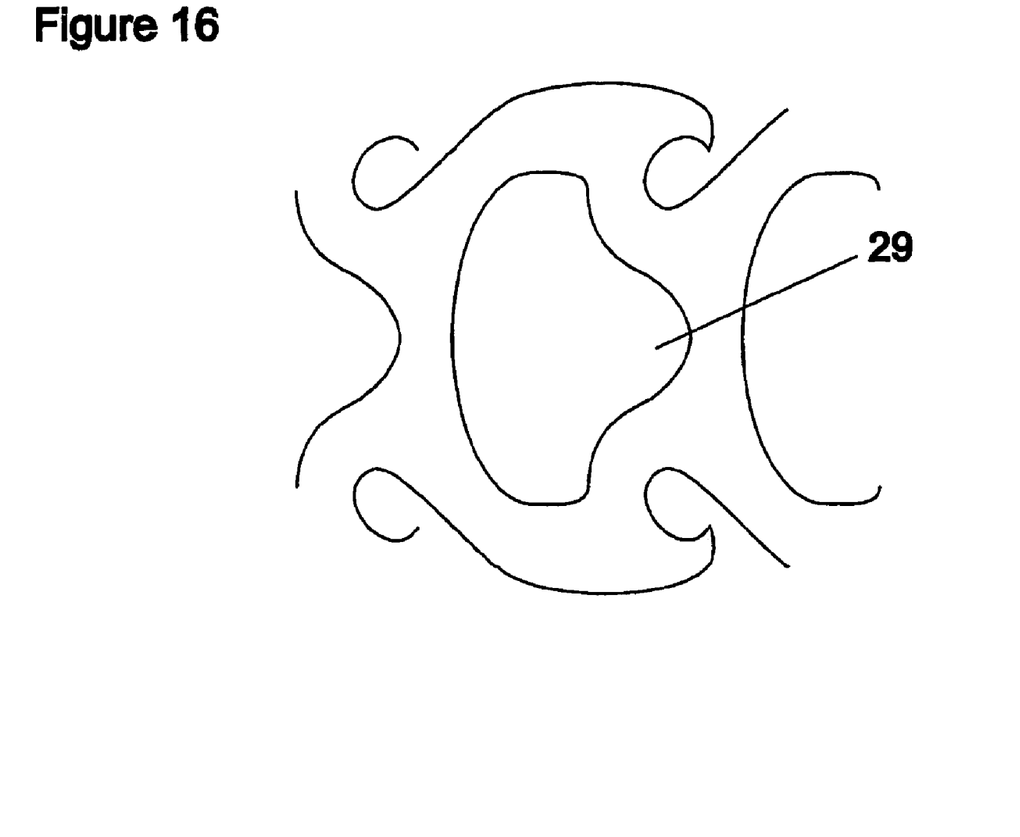
FIG. 16 shows a suitably channelled aperture to promote inwards latch curling, in a relaxed state.
Figure 17:
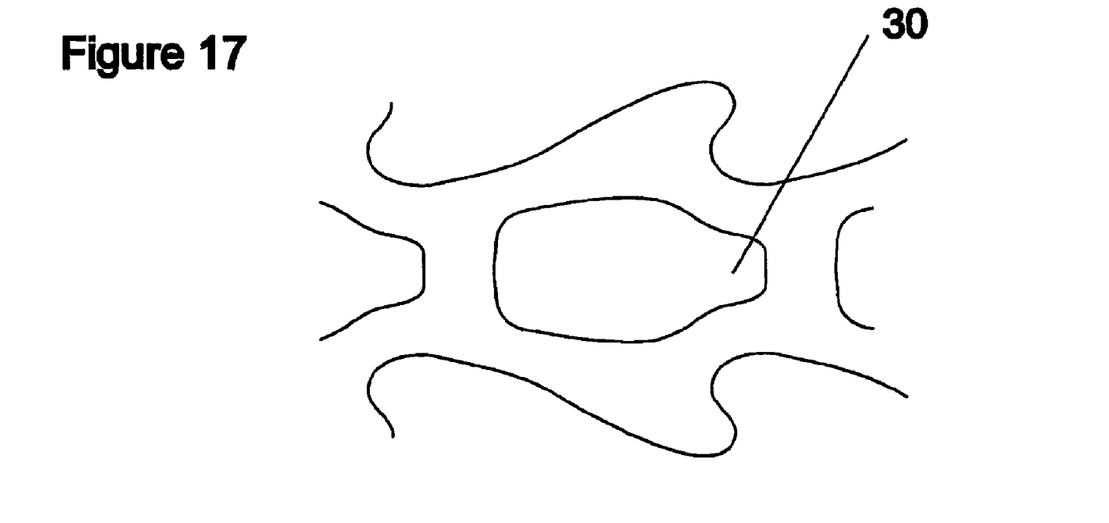
FIG. 17 shows a suitably channelled aperture to promote inwards latch curling, in a tensioned state.

At its simplest, this shaped channel involves a substantially V-shaped or U-shaped notch, whether in a tensed 29 or relaxed state 30, extending from the aperture into the rear wall of each cell (FIGS. 16 and 17).

In a threading operation, this notch serves to promote the curling of the latching members because the rear wall between them is now less rigid. (Compare FIGS. 5 and 7.) Furthermore, the longitudinal centre of the strip is inclined to slip into this notch, compelling the latching members to curl the opposite way—i.e. away from the operator and towards the target, as is desired.

Now, once the strip has been pulled tight around the target, the latching members must be placed in a location that inhibits withdrawal.

Figure 18:
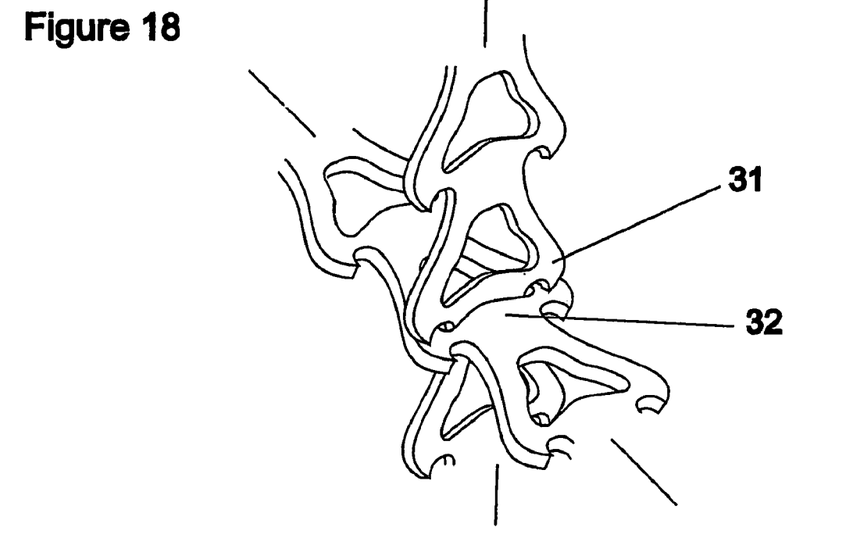
FIG. 18 shows the cells and latching members returned to a default position following threading.

At its simplest, this can be effected by use of a resiliently deformable material, wherein the cells return to a default shape once longitudinal tension is removed. In FIG. 18, for example, it is seen how this simple technique can operate, with the latching members 31 extending sideways to engage the rear wall 32 of the penetrated cell.

A more sophisticated methodology, however, is to exploit the curling of the latching members 33 by a complementary upward rotation of the rear wall of the penetrated cell 34, as illustrated in FIG. 19. If the latching members are made sufficiently long they may even extend over the top of the rear wall portion, achieving a latch of even greater strength. Additionally, the rotation of the latches 13 outwards of the main horizontal plane (see FIG. 6) can also be utilised to improve latching strength, since the latches reach further out.

Figure 20:
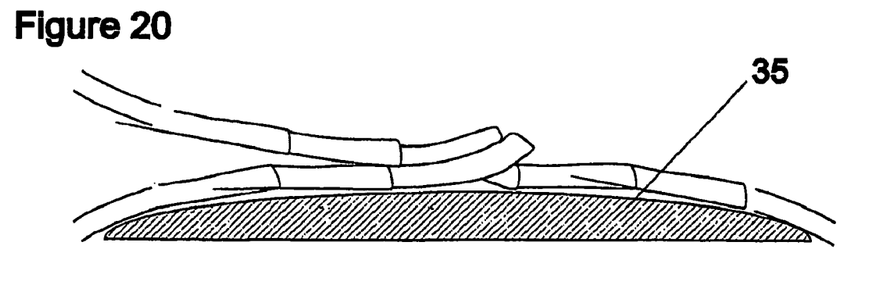
FIG. 20 shows a side view of the preferred outwards curling of the latching members when the tie strip is correctly fitted around target items.

Such latch curling is obtained by applying longitudinal tension in the opposite direction (i.e. trying to withdraw penetrant cells rather than thread them). Again, the additional notch 15 can greatly assist in this process since it promotes easier latch curling, and this can only be upwards because the enclosed target 35 actually prevents the latches from curling downwards. Hence the advantageous upwards curl is largely automatic at this stage (FIG. 20).

Figure 21:
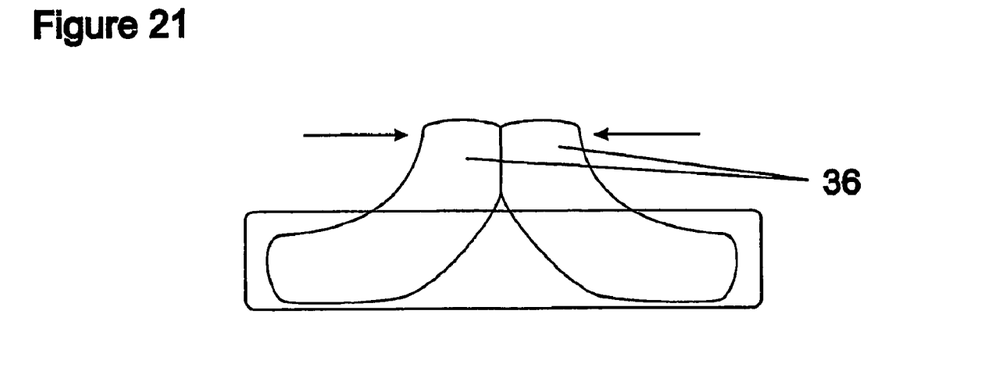
FIG. 21 shows a rear view of two latching members coming together when the strip is subjected to high longitudinal tension.

A further benefit of the rear wall notch is to draw the curled latching members together into this central channel, and if the latches are sufficiently long, they may abut one another 36 when subjected to sufficient withdrawal tension (FIG. 21). At this point the curling process is inhibited, and the two latches serve to reinforce one another, again increasing the overall strength of the latch. (Complete curling over of the latching members is not usually desirable, since it results in a loss of latching ability and the slipping of the tie loop back through the aperture. Sometimes, however, a controlled amount of slip can be built into the design to prevent over-tensioning from occurring.)

It can also be noted that the notch in the rear wall of the cells will help the wall to deform during this latching process. At first glance this would imply a weakness, but since the cells rely on topological deformations to function, this weakening of the rear wall can actually increase the strength of the latched tie. Without such a notch the rear wall acts just as a rigid barrier (as in FIG. 19), whereas with a notch the rear wall can curve around the latching members of the penetrant cell, thereby increasing the contact surface area and improving the latch strength.

Figure 22:
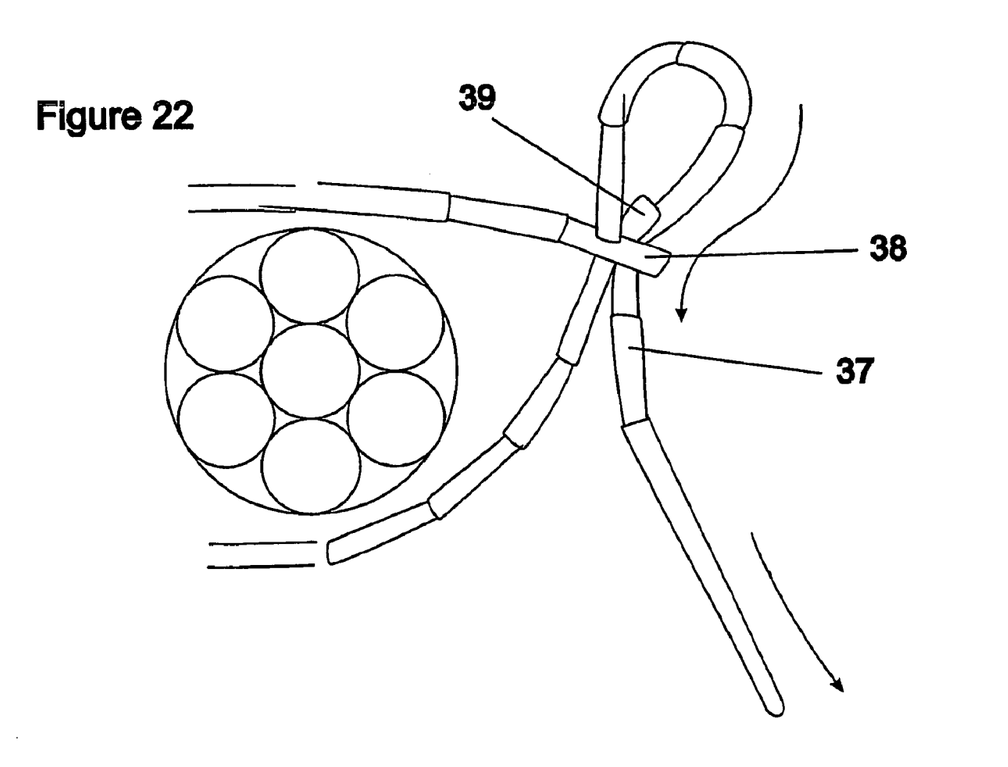
FIG. 22 shows a removal technique preferentially utilising the notch cut into the rear walls of the cell portions, together with the inward curling latches produced by this process.

Additionally, the rear wall notch affords a benefit if the tie strip needs to be removed. This is usually done by re-threading the re-entrant end (with tongue if present) 37 back through the aperture of the penetrated cell 38, in the opposite direction to which the tie was originally threaded (FIG. 22).

This process causes the strip to come undone, but requires adequate space in the apertures to allow such a double thickness of tie strip to be threaded through it. The extra notch in the rear wall can provide this additional space if required, without greatly compromising its other functions.

It can also be noted that because this removal technique is usually done at a steep pulling angle, the curling of the latching members 39 is inwards towards the enclosed target. This serves to make the removal process very easy, requiring little force from the operator.

The invention claimed is:

1. A flexible, integrally formed tie strip for forming a loop when passed through itself, comprising:
a plurality of identical cells formed in a strip, the cells forming generally loop-shaped enclosed apertures (10, 14) bounded by wall portions of the cells, each aperture allowing the passage of further cells through it, the cells being further provided with one or more latching members (11, 13, 26, 27, 31, 33) allowing passage of one cell through another in one direction but preventing passage of the cell in the reverse direction,
wherein the walls bounding the apertures can be folded to a saddle shape about transverse and longitudinal axes, so as to increase the width of the aperture without stretching the material of the walls, thereby facilitating the passage of a penetrant cell through the aperture of a further cell in use, and
wherein the aperture is extended rearwardly by a notch in the rear wall portion bounding the aperture, the notch promoting the saddle shape fold of the walls of the aperture, and
wherein a thickness of the rear wall of the aperture is substantially less at the notch than along the remainder of the aperture.

2. A flexible tie strip as claimed in claim 1, in which a rear wall portion of one aperture forms a front wall portion of a subsequent aperture.

3. A flexible tie strip as claimed in claim 1, wherein a front wall of each cell is generally semicircular and side walls are formed by short, roughly radial arms meeting the front wall.

4. A flexible tie strip as claimed in claim 1, wherein a cell in the saddle-shaped configuration during threading is further adapted to fold outwards to extend the width of the enclosed apertures to facilitate the passage of a penetrant cell.

5. A flexible tie strip as claimed in claim 3, wherein the change of shape of the penetrated cell is effected in use by the passage of the penetrant cell.

6. A flexible tie strip as claimed in claim 1, wherein in use during threading or attempted withdrawal the wall portions and/or the latching members of the penetrant cell preferentially curl about their longitudinal axes thereby altering the shape of the penetrant cell to facilitate passage of the cell through another.

7. A flexible tie strip as claimed in claim 6, wherein the bounding walls and/or latching members of the penetrant cell curl out of the horizontal plane of the strip causing the lateral width of the penetrant cell to decrease, in use.

8. A flexible tie strip as claimed in claim 1, wherein the cells are formed of elastic material, so that the cells are substantially restored to their original shape after one cell has passed though another.

9. A flexible tie strip as claimed in claim 6, wherein attempted withdrawal of a cell which has penetrated another invokes similar curling of the walls and/or latching members of the penetrant cell into a position that impeded withdrawal.

10. A flexible tie strip as claimed in claim 9, wherein on attempted withdrawal a complementary rotation of the wall of the penetrated cell further inhibits withdrawal of the penetrant cell, thereby improving latch integrity.

11. A flexible tie strip as claimed in claim 1, wherein tension in the strip causes rotation of the latching members about an axis perpendicular to the horizontal plane, so that the latching members move outwards under longitudinal tension thereby increasing the lateral width of the penetrant cell portion to inhibit withdrawal.

12. A flexible tie strip as claimed in claim 1, wherein the material of the strip has a Shore hardness in the range of S80 to S90 or D40 to D60, a flexural modulus between 0.01 GPa to 0.1 GPa, a tear strength exceeding 100 KN/m, and a tensile strength exceeding 25 MPa.

13. A flexible tie strip as claimed in claim 4, wherein the change of shape of the penetrated cell is effected in use by the passage of the penetrant cell.

14. A flexible tie strip as claimed in claim 7, wherein attempted withdrawal of a cell which has penetrated another invokes similar curling of the walls and/or latching members of the penetrant cell into a position that impeded withdrawal.

15. A flexible tie strip as claimed in claim 8, wherein attempted withdrawal of a cell which has penetrated another invokes curling of the walls and/or latching members of the penetrant cell into a position that impeded withdrawal.

16. A flexible tie strip as claimed in claim 1, wherein the wall portions of each separate cell have a roughly constant wall thickness other than at the notch.

17. A flexible tie strip as claimed in claim 16, wherein a front wall of a following cell closes a gap formed by the notch in the rear wall of a leading cell to form a closed aperture for the leading cell.

18. A flexible tie strip as claimed in claim 1, wherein the notch defines the rearmost part of the aperture.

* * * * *